United States Patent
Raasch-Malberg et al.

(10) Patent No.: US 8,748,518 B2
(45) Date of Patent: Jun. 10, 2014

(54) STABILIZATION OF POLYCARBONATES

(75) Inventors: Karen Raasch-Malberg, Ahrensburg (DE); Thomas Enge, Meitingen (DE)

(73) Assignees: Clariant Finance (BVI) Limited, Tortola (VG); Clariant Masterbatches (Deutschland), Lahnstein (DE)

( * ) Notice: Subject to any disclaimer, the term of this patent is extended or adjusted under 35 U.S.C. 154(b) by 300 days.

(21) Appl. No.: 12/601,727

(22) PCT Filed: May 21, 2008

(86) PCT No.: PCT/EP2008/056218
§ 371 (c)(1),
(2), (4) Date: Nov. 24, 2009

(87) PCT Pub. No.: WO2008/145574
PCT Pub. Date: Dec. 4, 2008

(65) Prior Publication Data
US 2010/0179257 A1 Jul. 15, 2010

(30) Foreign Application Priority Data

May 25, 2007 (EP) .................................... 07108964
Dec. 5, 2007 (EP) .................................... 07122394
Dec. 5, 2007 (EP) .................................... 07122395

(51) Int. Cl.
*C08K 5/3435* (2006.01)
*C08K 5/3417* (2006.01)
*C08K 5/16* (2006.01)
*C08K 5/10* (2006.01)
*C08K 5/07* (2006.01)

(52) U.S. Cl.
USPC ............. 524/91; 524/102; 524/198; 524/220; 524/290; 524/299; 524/359

(58) Field of Classification Search
USPC ............. 524/91, 102, 198, 220, 290, 299, 359
See application file for complete search history.

(56) References Cited

U.S. PATENT DOCUMENTS

| 5,874,493 | A | 2/1999 | Webster |
| 5,955,521 | A | 9/1999 | Rufus et al. |
| 6,297,377 | B1 | 10/2001 | Gupta et al. |
| 7,935,750 | B2 * | 5/2011 | Kogure et al. .................. 524/91 |
| 2009/0054586 | A1 * | 2/2009 | Hein et al. ..................... 524/611 |
| 2009/0191373 | A1 * | 7/2009 | Okazaki et al. ............. 428/41.8 |
| 2010/0163814 | A1 | 7/2010 | Raasch-Malberg et al. |

FOREIGN PATENT DOCUMENTS

| EP | 0924248 | 6/1999 |
| WO | WO 97/39051 | 10/1997 |
| WO | WO 00/22037 | 4/2000 |
| WO | WO 2006/034980 | 4/2006 |

OTHER PUBLICATIONS

USPTO Office Action for U.S. Appl. No. 12/601,693, mailed Nov. 17, 2010.
USPTO Office Action for U.S. Appl. No. 12/601,693, mailed Jun. 30, 2011.
PCT International Search Report for PCTEP2008/056218, mailed Sep. 10, 2008.
Anonymous: "Hindered Amine Light Stabizers for Polycarbonates"Research Disclosure, Mason Publications Hampshire, GB, vol. 3, No. 35, XP 007119371, Oct. 1993.
PCT International Preliminary Report on Patentability for PCT/EP2008/056218, mailed Sep. 17, 2009.
H. Zweifel; Plastics Additives Handbook, 5$^{th}$ ed. Hanser Publishers, Munich, pp. 369-372 (2000).
C. Krebs and M-A Avondet, Langzeitverhalton von Thermoplasten, Hanser, Munich, pp. 156-157 (1999).

* cited by examiner

*Primary Examiner* — Kriellion Sanders
(74) *Attorney, Agent, or Firm* — Anthony A. Bisulca

(57) ABSTRACT

The invention relates to the use of a specific hindered amine (hindered amine light stabilizer, HALS) and a specific bismalonate UV absorber for the stabilization of polycarbonates and of polycarbonate blends, in particular of polycarbonate/acrylonitrile-butadiene-styrene (PC/ABS) blends, with respect to UV radiation.

10 Claims, No Drawings

STABILIZATION OF POLYCARBONATES

The invention relates to the use of a specific hindered amine (hindered amine light stabilizer, HALS) and a specific bismalonate UV absorber for the stabilization of polycarbonates and of polycarbonate blends, in particular of polycarbonate/acrylonitrile-butadiene-styrene (PC/ABS) blends, with respect to UV radiation.

It is usual in the plastics industry to use additives in the form of compounds or masterbatches. Masterbatches for the purposes of the invention are compositions comprising a carrier polymer and the additive, where the concentrations present of the additive in the masterbatch are higher than in the final application, and the carrier polymer does not have to be the polymer of the final application.

Preferred concentrations of the additives in masterbatches are of from 0.5 to 90% by weight, in particular of from 1 to 80% by weight, even more preferably of from 6 to 80% by weight, the % by weight values being based on the total weight of the masterbatches.

Compounds for the purposes of the invention are compositions comprising a polymer and the additive, where the additive is already present in the compounded material in the desired concentration for the final application or article and equally the polymer is the desired polymer of the final application or article, and a physical shaping process is therefore all that is needed to convert the compounded material to the desired form for the final application or article.

PC/ABS blends and items or articles composed of PC/ABS blends are known to the person skilled in the art, being mixtures composed of PC and ABS. The terms blend and mixture are used synonymously hereinafter.

EP 924 248 B discloses compositions comprising a polycarbonate (PC) polymer, a non-basic hindered amine, comprising a piperazinyl unit, and a UV absorber. In paragraphs [0004] and [0005] the known technical difficulties are described which prevent use of HALS additives for the stabilization of PC. In particular, the presence of basic HALS leads to hydrolysis of the PC polymer chains. The result, as described in [0005], is impairment of mechanical properties. For this reason, nowadays practically only UV absorbers are used as light stabilizers for polycarbonates (H. Zweifel, Plastic Additives Handbook, 5th edition, Hanser Publishers, Munich, 2000, pp. 369-372). PC/ABS blends which are therefore modified only with UV absorbers but without HALS, sometimes have insufficient UV resistance. Furthermore, high concentrations of UV absorbers are often needed for stabilization. These disadvantages are known to the person skilled in the art.

The use of UV absorbers alone for the stabilization of PC/ABS blends leads to rapid impairment of mechanical properties via UV radiation, since the butadiene fractions of the ABS are rapidly damaged via photooxidation in the absence of adequate UV protection via HALS, as described in EP 924 248 B [0005], and in C. Krebs and M.-A. Avondet, Langzeitverhalten von Thermoplasten, Hanser, Munich 1999, pp. 156-157. In particular, the result is considerable yellowing and, associated therewith, loss of mechanical properties. Examples in EP 924 248 B show that the stabilization of PC with conventional HALS leads to mechanical properties poorer than those of unstabilized PC (Tables 5, 7 and 10).

WO 97/39051 A discloses the use of compositions comprising at least two different HALS for the stabilization of polypropylene. Although the description also mentions PC as a possible polymer to be stabilized as a theoretical possibility in a long list, these compositions have only poor suitability for the stabilization of PC or PC/ABS blends, since performance characteristics, in particular mechanical properties, are impaired.

Stringent requirements are placed upon plastics parts composed of PC/ABS blends: they have to exhibit high and lasting colourfastness, minimum amounts of additives are to be used for stabilization, maximum lightfastness and maximum weather resistance are to be achieved.

The additive masterbatches used for stabilization of the PC/ABS blends are to have high loading of the additives, i.e. a high concentration. Furthermore, the masterbatches have to exhibit good miscibility and compatibility with the PC/ABS blend. The additives have to have good dispersion in the masterbatch, in the compounded material and in the PC/ABS blend, and the masterbatch and/or the compounded material should not have negative effects on the mechanical properties of the final article. PC/ABS blends are preferably used for the production of items for the automobile industry.

The known additive systems do not meet all of the current requirements placed upon the stabilization of PC/ABS blends. There was a need for improved stabilization of PC/ABS blends.

Surprisingly, masterbatches comprising a specific HALS additive and a specific UV absorber cause improved stabilization of PC/ABS blends, in particular with respect to yellowing.

Subject of the invention is a composition Z comprising a component A, a component B and a component C, where component A is a compound of the formula (I);

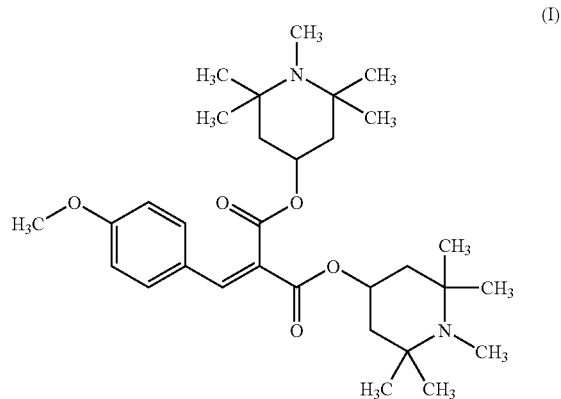

component C is one or more polymers selected from the group consisting of polycarbonates (PC),
of blends composed of polycarbonate (PC) and of one or more polymers other than polycarbonate (polycarbonate blend or PC blend), this further polymer other than polycarbonate in the PC blend preferably being selected from the group consisting of styrene copolymers, preferred styrene copolymers being acrylonitrile-butadiene-styrene (ABS), acrylonitrile-styrene-acrylate (ASA), acrylonitrile-ethylene-propylene-diene rubber-styrene (acrylonitrile-EPDM-styrene), methyl methacrylate-butadiene-styrene or styrene-acrylonitrile (SAN); or from the group consisting of the polyesters, preferred polyesters being polyethylene terephthalate (PET) or polybutylene terephthalate (PBT); or from the group consisting of the rubbers, preferred rubbers being nitrile rubber, polybutadiene, polyisoprene or acrylate rubber, or from the group consisting of the polyvinyl polymers and of the vinyl chloride copolymers;
and of polymers compatible with polycarbonates, these polymers compatible with polycarbonates being selected from the group consisting of acrylonitrile-butadiene-styrene (ABS), styrene-acrylonitrile (SAN) and polystyrene (PS);

and component B being a compound of formula (III).

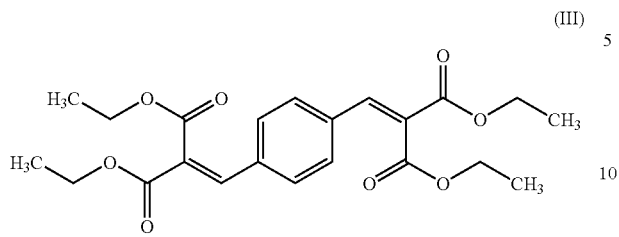
(III)

Optionally, the composition Z comprises as a fourth component a component D, the component D being a UV stabilizer which is particularly suitable for the stabilization of PC and of PC blends, in particular for the stabilization of PC/ABS blends, component D therefore being a compound selected from the group consisting of the compounds of the formulae (II), (IV), (V), (VI), (VII), (VIII), (IX), (X) and (XI).

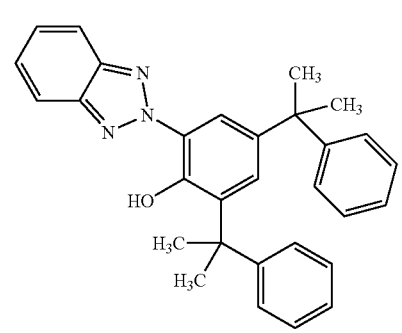
(II)

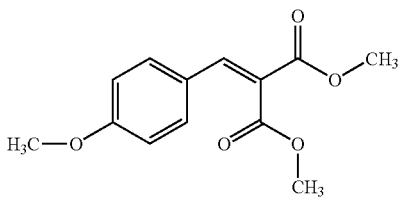
(IV)

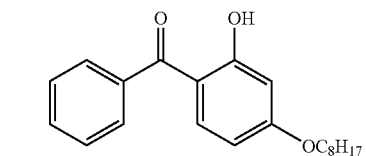
(V)

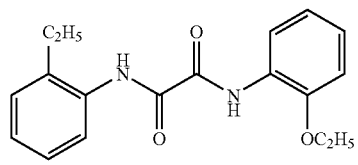
(VI)

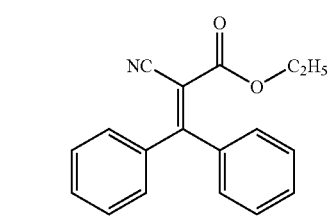
(VII)

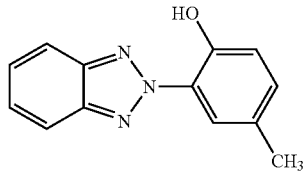
(VIII)

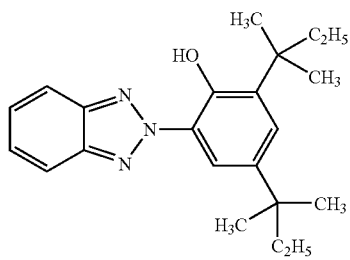
(IX)

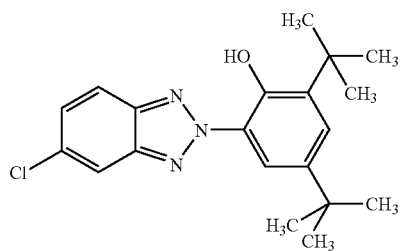
(X)

(XI)

Component D is preferably composed of one or more UV stabilizers, more preferably of one or two UV stabilizers, even more preferably of one UV stabilizer.

Component D is preferably a compound selected from the group of compounds of the formulae (II), (VIII) and (X), more preferably component D is a compound of formula (II).

The composition Z can be a masterbatch, a compounded PC material or a stabilized PC polymer or a stabilized PC blend. A PC blend for the purpose of the invention is composed of PC and of one or more polymers other than polycarbonate (polycarbonate blend or PC blend). The PC can also comprise a plurality of polycarbonates.

The composition Z is preferably free from effective amounts of further HALS with a chemical structure other than the structure of the compound of the formula (I). For the purposes of the invention, effective amounts are amounts in which HALS is usually used for the stabilization of polymers. The compositions Z more preferably comprise no more than 0.1% by weight, even more preferably no more than 0.05% by weight, in particular no more than 0.01% by weight, of HALS with a chemical structure other than the structure of the compound of the formula (I), the % by weight values being based in each case on the total weight of the composition Z; the compositions Z are very particularly preferably free from further HALS with a chemical structure other than the structure of the compound of the formula (I).

In the event that the composition Z is a masterbatch, component C is preferably a polymer selected from the group consisting of ABS, SAN, PS, PC and PC/ABS polymer; more preferably of ABS, PC and SAN polymer; further more preferably ABS, PC and SAN, even more preferably of SAN and PC polymer, especially of SAN.

In the event that the composition Z is a compounded PC material or a stabilized PC polymer or a stabilized PC blend, component C is preferably PC or a PC blend,
the further polymer other than polycarbonate in the PC blend preferably being selected from the group consisting of styrene copolymers, preferred styrene copolymers being acrylonitrile-butadiene-styrene (ABS), acrylonitrile-styrene-acrylate (ASA), acrylonitrile-EPDM-styrene, methyl methacrylate-butadiene-styrene or styrene-acrylonitrile (SAN); or from the group consisting of the polyesters, preferred polyesters being polyethylene terephthalate (PET) or polybutylene terephthalate (PBT); or from the group consisting of the rubbers, preferred rubbers being nitrile rubber, polybutadiene, polyisoprene or acrylate rubber, or from the group consisting of the polyvinyl polymers and of the vinyl chloride copolymers;
component C particularly preferably being a PC or a PC/ABS polymer.

Composition Z preferably comprises
from 0.01 to 30% by weight of component A,
from 20 to 99.98% by weight of component C,
from 0.01 to 30% by weight of component B, and
from 0 to 79.98% by weight of further substances, preferably component D and/or substances S;
more preferably
from 0.01 to 30% by weight of component A,
from 30 to 99.98% by weight of component C,
from 0.01 to 30% by weight of component B, and
from 0 to 69.98% by weight of further substances, preferably component D and/or substances S;
even more preferably
from 0.05 to 15% by weight of component A,
from 32.5 to 99.9% by weight of component C,
from 0.05 to 15% by weight of component B, and
from 0 to 67.4% by weight of further substances, preferably component D and/or substances S;
the % by weight values being based in each case on the total weight of the composition Z; where the % by weight values for components A, B and C and for the further substances, preferably component D and/or substances S, always give a total of 100% by weight.

In the event that the composition Z is a masterbatch, the composition Z preferably comprises
from 1 to 30% by weight of component A,
from 20 to 98% by weight of component C,
from 1 to 30% by weight of component B, and
from 0 to 78% by weight of further substances, preferably component D and/or substances S;
more preferably
from 1 to 30% by weight of component A,
from 30 to 98% by weight of component C,
from 1 to 30% by weight of component B, and
from 0 to 68% by weight of further substances, preferably component D and/or substances S;
even more preferably
from 2.5 to 15% by weight of component A,
from 30.5 to 95% by weight of component C,
from 2.5 to 15% by weight of component B, and
from 0 to 64.5% by weight of further substances, preferably component D and/or substances S;
in particular
from 5 to 12% by weight of component A,
from 39 to 90% by weight of component C,
from 5 to 12% by weight of component B, and from 0 to 51% by weight of further substances, preferably component D and/or substances S;
the % by weight values being based in each case on the total weight of the composition Z; where the % by weight values for components A, B and C and for the further substances, preferably component D and/or substances S, always give a total of 100% by weight.

In the event that the composition Z is a compounded PC material or a stabilized PC polymer or a stabilized PC blend, the composition Z preferably comprises
from 0.01 to 5% by weight of component A,
from 80 to 99.98% by weight of component C,
from 0.01 to 5% by weight of component B, and
from 0 to 19.98% by weight of further substances, preferably component D and/or substances S;
particularly preferably
from 0.02 to 2% by weight of component A,
from 86 to 99.9% by weight of component C,
from 0.02 to 2% by weight of component B, and
from 0 to 13.96% by weight of further substances, preferably component D and/or substances S;
in particular
from 0.05 to 1% by weight of component A,
from 88 to 99% by weight of component C,
from 0.05 to 1% by weight of component B, and, optionally,
from 0 to 11.9% by weight of further substances, preferably component D and/or substances S;
the % by weight values being based in each case on the total weight of the composition Z; where the % by weight values for components A, B and C and for the further substances, preferably component D and/or substances S; always give a total of 100% by weight.

The ratio by weight of component A to component B in the composition Z is preferably from 1:10 to 10:1, preferably from 1:5 to 5:1, particularly preferably from 1:3 to 3:1, in particular from 1:1 to 3:1.

In the event that the composition Z further comprises component D, the ratio by weight of component A to the combined amounts of component B and D in the composition Z is preferably from 1:10 to 10:1, preferably from 1:5 to 5:1, particularly preferably from 1:3 to 3:1, in particular from 1:3 to 1:1.

In the event that the composition Z further comprises component D, the ratio by weight of component B to component D in the composition Z is preferably from 1:10 to 10:1, preferably from 1:5 to 5:1, particularly preferably from 1:3 to 3:1, in particular from 1.1:1 to 1:1.1.

The composition Z preferably comprises from 10 to 100% by weight, particularly preferably from 50 to 100% by weight, in particular from 75 to 100% by weight, specifically from 90 to 100% by weight, of the total amount of components A and B and C and optionally D, the % by weight values being based in each case on the total weight of the composition Z.

In the event that the composition Z is a masterbatch and the composition Z comprises component D, the composition Z preferably comprises
from 1 to 30% by weight of component A,
from 1 to 30% by weight of component B,
from 1 to 30% by weight of component D,
from 10 to 97% by weight of component C, and
from 0 to 87% by weight of further substances, preferably substances S;
particularly preferably
from 2.5 to 15% by weight of component A,
from 2.5 to 15% by weight of component B, from 2.5 to 15% by weight of component D,
from 30.5 to 92.5% by weight of component C, and
from 0 to 62% by weight of further substances, preferably substances S;
in particular
from 5 to 12% by weight of component A,
from 5 to 12% by weight of component B,
from 5 to 12% by weight of component D,
from 39 to 75% by weight of component C, and
from 0 to 46% by weight of further substances, preferably substances S;
the % by weight values being based in each case on the total weight of the composition Z; where the % by weight values for components A, B, C and D and for the further substances, preferably substances S, always give a total of 100% by weight.

In the event that the composition Z comprises a compounded PC material or a stabilized PC polymer or a stabilized PC blend, and the composition Z comprises component D, the composition Z preferably comprises
from 0.01 to 5% by weight of component A,
from 0.01 to 5% by weight of component B,
from 0.01 to 5% by weight of component D,
from 75 to 99.97% by weight of component C, and
from 0 to 24.97% by weight of further substances, preferably substances S;
more preferably
from 0.01 to 5% by weight of component A,
from 0.01 to 5% by weight of component B,
from 0.01 to 5% by weight of component D,
from 80 to 99.97% by weight of component C, and
from 0 to 19.97% by weight of further substances, preferably substances S;
even more preferably
from 0.02 to 2% by weight of component A,
from 0.02 to 2% by weight of component B,
from 0.02 to 2% by weight of component D,
from 84 to 99.94% by weight of component C, and
from 0 to 15.94% by weight of further substances, preferably substances S;
in particular
from 0.05 to 1% by weight of component A,
from 0.05 to 1% by weight of component B,
from 0.05 to 1% by weight of component D,
from 87 to 99.85% by weight of component C, and
from 0 to 12.85% by weight of further substances, preferably substances S;
the % by weight values being based in each case on the total weight of the composition Z; where the % by weight values for components A, B, C and D and for the further substances, preferably substances S, always give a total of 100% by weight.

The composition Z preferably comprises, as further substances S, one or more of components F and/or E.

Component F is a plastics additive from the group of the secondary antioxidants, in particular of the group of the phosphites, and
component E is a plastics additive from the group of the primary antioxidants, in particular of the group of the sterically hindered phenols.

Component F is preferably a secondary antioxidant selected from the group consisting of Tetrakis(2,4-di-tert-butylphenyl)[1,1-biphenyl]-4,4'-diylbisphosphonite, Tris(2,4-di-tert-butylphenyl)phosphite, Bis(2,4-di-tert-butylphenyl)pentaerytritol diphosphite and Bis(2,4-dicumylphenyl)pentaerytritoldiphosphite.

Component E is preferably the primary antioxidant Tetrakis(methylene 3,5-di-tert-butyl-hydroxycinnamate)methane or Octadecyl 3,5-di-tert-butylhydroxyhydrocinnamate.

The invention further provides a process for the preparation of the composition Z, characterized in that components A, B and C and optionally D and, if appropriate, further substances, in particular the substances S, and specifically components F and E, are physically mixed.

The invention therefore also provides a process for the stabilization of PC or PC blends, characterized in that the PC or the PC blend is physically mixed with component A, B and optionally D and, if appropriate, further substances, in particular the substances S, and specifically components F and E.

It is preferable that mixing is via extrusion or kneading or injection moulding or compression moulding, particularly preferably extrusion or injection moulding.

The mixing is preferably carried out continuously or discontinuously.

The mixing assemblies conventional in the masterbatch industry and plastics industry are used, preferably extruders, presses, or injection-moulding machines or kneaders.

The mixing temperature is preferably from 100° C. to 380° C., particularly preferably from 120° C. to 350° C.

The mixing time is preferably from 10 sec to 1 h, particularly preferably from 15 sec to 30 min.

The mixing time for continuous mixing is preferably from 10 sec to 1 h, particularly preferably from 15 sec to 15 min; the mixing time for discontinuous mixing is preferably from 10 sec to 1 h, particularly preferably from 15 sec to 30 min.

In the event that the composition Z is a masterbatch, it is preferable to mix via extrusion or kneading, particularly preferably via extrusion. The mixing is preferably carried out continuously or discontinuously, particularly preferably continuously. The mixing assemblies conventional in the masterbatch industry are used, preferably extruders or kneaders.

The mixing temperature is preferably from 100° C. to 380° C., particularly preferably from 120° C. to 350° C., in particular from 150° C. to 320° C.

The mixing time is preferably from 10 sec to 1 h, particularly preferably from 15 sec to 15 min.

The mixing time for continuous mixing is preferably from 10 sec to 1 h, particularly preferably from 15 sec to 15 min; the mixing time for discontinuous mixing is preferably from 1 min to 1 h, particularly preferably from 2 to 15 min.

In the event that the composition Z is a compounded PC material or a stabilized PC polymer or a stabilized PC blend, mixing preferably takes place via extrusion or injection moulding or compression moulding, preferably via injection moulding. The mixing is preferably carried out continuously or discontinuously, particularly preferably continuously. The mixing assemblies conventional in the plastics industry are used, preferably extruders, presses or injection moulding machines.

The mixing temperature is preferably from 160° C. to 380° C., particularly preferably from 180° C. to 320° C.

The mixing time is preferably from 10 sec to 1 h, particularly preferably from 15 sec to 1 h, in particular from 15 sec to 30 min.

The mixing time for continuous mixing is preferably from 10 sec to 1 h, particularly preferably from 15 sec to 30 min, in particular from 15 sec to 10 min; the mixing time for discontinuous mixing is preferably from 10 sec to 1 h, particularly preferably from 15 sec to 1 h, in particular from 15 sec to 30 min.

For preparation of a stabilized PC polymer or stabilized PC blend, it is preferable to mix a masterbatch MB with the PC polymer to be stabilized or with the PC blend to be stabilized.

The invention further provides the use of the composition Z for the preparation of, or the use of the compositions Z as, stabilized PC polymer or stabilized PC blend.

In the event that the composition Z is a masterbatch MB, the invention further provides the use of the composition Z for the preparation of stabilized PC polymers or stabilized PC blends, where the stabilized PC polymers or stabilized PC blends can take the form of intermediate products or else the form of final products. The intermediate products can take the form of pellets, powder or chips.

In particular, the compositions Z are used for the preparation of, or as, stabilized PC polymer or stabilized PC blend for the automotive industry.

Further substances S, which can be present in the composition Z, are colourants, preferred colourants being organic and inorganic dyes and pigments, preferred organic pigments being azo or disazo pigments, laked azo or disazo pigments or polycyclic pigments, particularly preferably phthalocyanine, diketopyrrolopyrrole, quinacridone, perylene, dioxazine, anthraquinone, thioindigo, diaryl or quinophthalone pigments; inorganic pigments preferably used for pigmentation being suitable metal oxides, mixed oxides, aluminium sulphates, chromates, metal powders, pearlescent pigments (mica), luminescent colours, titanium oxides, cadmium lead pigments, iron oxides, carbon black, silicates, nickel titanates, cobalt pigments or chromium oxides; the colourants here can also be used as masterbatches;

fillers, preferably silica, zeolites, silicates, particularly preferably aluminium silicates, sodium silicate, calcium silicates; and chalk or talc;

auxiliaries, preferably acid scavengers, lubricants, stearates, blowing agents, nucleating agents, peroxides, or oxides such as magnesium oxide;

antioxidants, preferably primary or secondary antioxidants;

antistatic agents, preferably glycerol stearates, glycerol monostearates, alkylamines, fatty acid mixtures, amines, ethoxylated amines, alkylsulphonates, glycerol esters or mixtures (blends) thereof;

UV absorbers, slip agents, antifogging agents, anticondensation agents and/or suspension stabilizers, flame retardants;

or a mixture composed of these substances.

Further subject of the invention is the joint use of the component A as defined above, also in all its preferred embodiments, in combination with the component B as defined above, also in all its preferred embodiments, and optionally with the component D as defined above, also in all its preferred embodiments, for the stabilization of polymers, e.g. for the stabilization of polymers against the damaging influence of light or of heat, especially against the damaging influence of visible or UV light, the polymers having been selected from the group consisting of the polycarbonates (PC) and of the blends composed of polycarbonate and of one or more polymers other than polycarbonate (polycarbonate blends or PC blends);

it is preferable that the further polymer other than polycarbonate in the PC blend has been selected from the group consisting of styrene copolymers, preferred styrene copolymers being acrylonitrile-butadiene-styrene (ABS), acrylonitrile-styrene-acrylate (ASA), acrylonitrile-ethylene-propylene-diene rubber-styrene (acrylonitrile-EPDM-styrene), methyl methacrylate-butadiene-styrene or styrene-acrylonitrile (SAN); or from the group of the polyesters, preferred polyesters being polyethylene terephthalate (PET) or polybutylene terephthalate (PBT); or from the group of the rubbers, preferred rubbers being nitrile rubber, polybutadiene, polyisoprene or acrylate rubber, or from the group of the polyvinyl polymers and of the vinyl chloride copolymers.

Surprisingly, the compositions Z feature high and lasting colourfastness. The amounts of additives needed for stabilization are low, and lightfastness and weather resistance are high. Masterbatches with high loading can be prepared. The inventive compositions exhibit good miscibility and compatibility with PC polymers and PC blends, and the additives give good dispersion in the masterbatch, in the compounded PC material, in the PC polymer and in the PC blend, and mechanical properties are good.

It was also surprising that the specific HALS achieves markedly improved colourfastness, without any impairment of mechanical properties when comparison is made with HALS-free stabilization or stabilization by a HALS with a structure other than that of the formula (I).

Test Methods:

Product properties are determined by the following methods:

Determination of mechanical properties, such as tensile strength, tensile strength at break, tensile strain and tensile strain at break according to DIN EN ISO 527-1.

The intention is minimum change in mechanical properties and in particular no severe impairment thereof Determination of Charpy impact properties, such as impact resistance and notched impact resistance according to DIN EN ISO 179-1.

The intention is minimum change in impact properties and in particular no severe impairment thereof Determination of Vicat softening point according to DIN EN ISO 306 There should be minimum change in the Vicat point.

Determination of light-stability (I): Exposure to laboratory Xenon arc lamp, 1250 W/m$^2$ (300-800 nm) in a Xenotest 150S instrument. Yellowing is determined by visual inspection. Minimum yellowing is to occur.

Determination of light stability (II) at increased temperature according to PV1303 (test method of Volkswagen, Germany): Testing of automotive-interior components on exposure to light with Xenon arc instrument according to DIN 75202; black standard temperature: 100° C.±3° C.; test chamber temperature: 65° C.±3° C.; relative humidity: 20±10%; irradiance: 60 W/m$^2$ (300±400 nm); exposure 5 cycles. Qualitative evaluation of colour change using the grey scale to DIN EN 20105-102 and visual inspection. Minimum yellowing is to occur.

Testing of melt index, also termed melt volume rate or MFR, to ISO 1133: MFR should not change excessively.

EXAMPLES

Substances Used

Component A: compound of the formula (I), Hostavin® PR-31, Clariant International Ltd.

Component D2: a compound of the formula (II) Tinuvin® 234, Ciba Specialty Chemicals AG Component B: a compound of the formula (III), Hostavin® B-CAP, Clariant International Ltd.

Component D5: a compound of the formula (V), Chimassorb® 81, Ciba Specialty Chemicals AG Component D8: a compound of the formula (VIII), Tinuvin® P, Ciba Specialty Chemicals AG Component C1: SAN polymer, a styrene-acrylonitrile whose Vicat softening point is at least 96° C. (B/50) and whose melt volume rate is from 22.0 to 36.0 cm³/10 min (220° C./5 kg)

Component C2: PC/ABS blend whose density is 1100 kg/m³ and whose melt volume rate is 12 cm³/10 min (260° C./5 kg)

Component C3: PC/ABS blend whose density is 1120 kg/m³ and whose melt volume rate is 17 cm³/10 min (260° C./5 kg)

Component C4: multi purpose, low viscosity grade polycarbonate PC

Component F1:

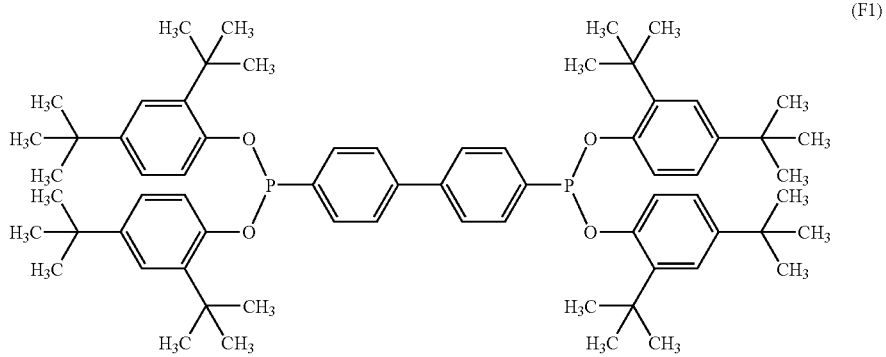

Tetrakis(2,4-di-tert-butylphenyl)[1,1-biphenyl]-4,4′diylbisphonite
Component of the formula (F1)

Component F2:

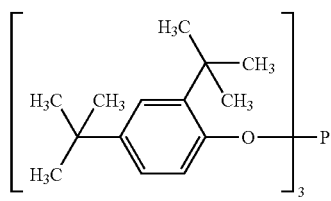

Tris(2,4-di-tert-butylphenyl)phosphite
Component of the formula (F2)

Component E1:

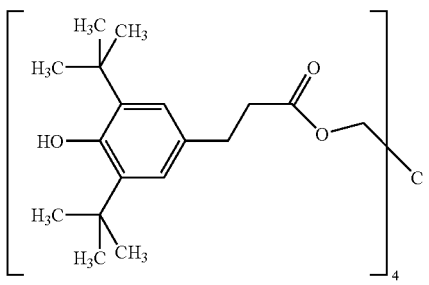

Tetrakis(methylene 3,5-di-tert-butylhydroxyhydrocinnamate]-methane
Compound of the formula (E1)

Component H1: a compound of the formula (XII), Tinuvin® 770, Ciba Specialty Chemicals AG

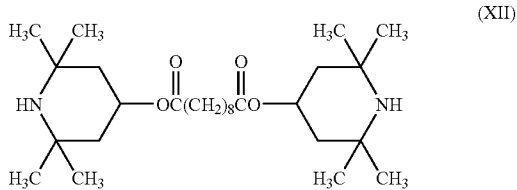

Component SI: Ankermag B 21 magnesium oxide MgO, Magnifin Magnesiaprodukte GmbH & Co. KG Component SII: (grey) colour masterbatch Parts hereinafter means parts by weight, "ex" means example, "comp ex" means comparative example, and values stated in the tables are parts, unless otherwise indicated.

Comparative Examples 1 and 2 and Examples 11 and 12

The components are homogenized together in a twin-screw extruder, Table B gives the parts used; the process parameters cited in Table A are used, and the corresponding compositions are obtained.

TABLE A

| Ex | Composition | Extruder Temperature | Time |
|---|---|---|---|
| comp ex 1 | 1 | 150 to 250° C. | 15-20 s |
| comp ex 2 | 2 | 180 to 215° C. | 15-20 s |
| 11 | 11 | 180 to 215° C. | 15-20 s |
| 12 | 12 | 180 to 215° C. | 15-20 s |

TABLE B

| | | Components | | | | | | | |
|---|---|---|---|---|---|---|---|---|---|
| Ex | Composition | A | D2 | B | C1 | F1 | F2 | E1 | S1 |
| comp ex 1 | 1 | — | 5 | 7.5 | 80 | 2.5 | 2.5 | 2.5 | — |
| comp ex 2 | 2 | — | 10 | 15 | 70 | 2.5 | — | 2.5 | — |
| 11 | 11 | 7.5 | 5 | 7.5 | 75 | 2.5 | — | 2.5 | — |
| 12 | 12 | 7.5 | 5 | 7.5 | 71 | 1.25 | 1.25 | 2.5 | 4 |

Examples 21, 51 and 52 and Comparative Examples 20, 40, 41 and 42

The compositions obtained in comparative examples 1 and 2 and in examples 11 and 12 were mixed with further components and processed in an injection-moulding machine to give injection mouldings. Table C gives the parts of components.

TABLE C

| | | Components used | | | | | | |
|---|---|---|---|---|---|---|---|---|
| | | Composition | | | | | | |
| Ex | Composition | 1 | 2 | 11 | 12 | C2 | C3 | SII |
| comp ex 20 | 20 | — | — | — | — | — | 100 | — |
| 21 | 21 | — | — | 4 | — | — | 92 | 4 |
| comp ex 40 | 40 | — | — | — | — | 100 | — | — |
| comp ex 41 | 41 | 4 | — | — | — | 92 | — | 4 |
| comp ex 42 | 42 | — | 4 | — | — | 92 | — | 4 |
| 51 | 51 | — | — | 4 | — | 92 | — | 4 |
| 52 | 52 | — | — | — | 4 | 92 | — | 4 |

Tables 1 to 3 cite the values measured.

TABLE 1

| | Light stability II | |
|---|---|---|
| Ex | Visual result | Grey scale |
| 21 | slightly yellowed | 3 to 4 |
| comp ex 41 | severely yellowed | 1 to 2 |
| comp ex 42 | severely yellowed | 1 to 2 |
| 51 | slightly yellowed | 2 to 3 |
| 52 | slightly yellowed | 2 |

Before the light stability test, the compositions are essentially colorless. The compositions Z counteract yellowing. Although composition 41, when compared with 52, comprises slightly more antioxidants (components F1 and F2) with the same UV absorber concentrations (components D2 and B), yellowing is substantially more severe in the HALS-free composition 41. Comparison of composition 41 and 42 with 51 and 52 shows, that only using UV absorbers alone gives substantially more severe yellowing than with presence of component A. Even a doubling of the UV absorber concentration in composition 42 results in substantially more severe yellowing when comparison is made with composition 51.

TABLE 2

| Ex | Notched impact resistance [%] | Impact-resistance [mJ/mm$^2$] | Vicat [° C.] |
|---|---|---|---|
| comp ex 20 | 100% | 94.5 | 122.4 |
| 21 | 95.0% of comp ex 20 | 95.0 | 116.8 |
| comp ex 40 | 100% | 84.7 | 106.4 |
| comp ex 41 | 88.0% of comp ex 40 | 70.0 | 103.3 |
| comp ex 42 | 114.0% of comp ex 40 | 87.3 | 102.3 |
| 51 | 102.0% of comp ex 40 | 86.6 | 103.4 |
| 52 | 95.3% of comp ex 40 | 86.6 | 103.5 |

It is apparent that the impact properties have been little affected, and in particular have actually tended to improve slightly. Vicat point has decreased only slightly.

It is also apparent that there is little effect on tensile properties in the inventive compositions, indeed there is sometimes an improvement. In particular, comparison of 51 and 52 with the HALS-free formulation comp ex 42 shows no impairment of mechanical properties.

TABLE 3

| Ex | Tensile strength [N/mm$^2$] | Tensile strength at break [N/mm$^2$] | Tensile strain at break [%] |
|---|---|---|---|
| comp ex 20 | 51.0 | 45.1 | 60.0 |
| 21 | 51.7 | 45.0 | 55.2 |
| comp ex 40 | 48.4 | 39.2 | 32.6 |
| comp ex 41 | 47.9 | 38.4 | 17.5 |
| comp ex 42 | 48.2 | 39.0 | 25.7 |
| 51 | 47.7 | 39.2 | 33.6 |
| 52 | 47.4 | 38.6 | 27.4 |

Further parameters for the inventive examples are shown in Table 4.

TABLE 4

| Ex | MFR [g/10 min] at 260° C./5 kg | Tensile strain [%] |
|---|---|---|
| 21 | 27.1 | 4.87 |
| 51 | 26.8 | 4.41 |
| 52 | 26.2 | 4.34 |

Comparative Examples 3, 4, 5, 6 and 13 and Example 14

The components are homogenized together in a twin-screw extruder at a temperature of 180 to 250° C. in 15 to 20 seconds, and Table E gives the parts used; and the corresponding compositions are obtained.

TABLE E

| | | Components | | | | | | |
|---|---|---|---|---|---|---|---|---|
| Ex. | Composition | A | D2 | B | D5 | D8 | H1 | C1 |
| comp ex 13 | 13 | 10 | — | — | — | — | — | 90 |
| 14 | 14 | 10 | — | 5 | — | 5 | — | 80 |
| comp ex 3 | 3 | — | — | — | — | — | 10 | 90 |
| comp ex 4 | 4 | — | — | 10 | — | — | — | 90 |
| comp ex 5 | 5 | — | 10 | — | — | — | — | 90 |
| comp ex 6 | 6 | — | — | — | 10 | — | — | 90 |

Comp Ex 40, 43, 44, 45, 46, 47, 53, 54, and 56 and Ex 55, 57 and 58

The compositions obtained in comparative examples 3-6 and 13, and 16 and example 14 were mixed with further components and processed in an injection-moulding machine to give injection mouldings. Table F gives the parts of components.

TABLE F

| | | Components used |||||||
| | | Compositon ||||||
| Ex. | Composition | 13 | 14 | 3 | 4 | 5 | 6 | C2 | C4 |
|---|---|---|---|---|---|---|---|---|---|
| comp ex 40 | 40 | — | — | — | — | — | — | 100 | — |
| comp ex 43 | 43 | — | — | 1.5 | — | — | — | 98.5 | — |
| comp ex 53 | 53 | 1.5 | — | — | — | — | — | 98.5 | — |
| comp ex 44 | 44 | 0.5 | — | 1 | — | — | — | 98.5 | — |
| comp ex 45 | 45 | 1 | — | 0.5 | — | — | — | 98.5 | — |
| comp ex 46 | 46 | — | — | — | — | — | 1.5 | 98.5 | — |
| comp ex 54 | 54 | 0.375 | — | 0.375 | — | — | 0.75 | 98.5 | — |
| comp ex 47 | 47 | — | — | — | 1.5 | 1.5 | — | 97 | — |
| 55 | 55 | 1.5 | — | — | 0.75 | 0.75 | — | 97 | — |
| comp ex 56 | 56 | 3 | — | — | — | — | — | 97 | — |
| comp ex 65 | 65 | — | — | — | 3 | — | — | 97 | — |
| 66 | 66 | 1.5 | — | — | 1.5 | — | — | 97 | — |
| comp ex 62 | 62 | 3 | — | — | — | — | — | — | 97 |
| comp ex 67 | 67 | — | — | — | 3 | — | — | — | 97 |
| 68 | 68 | 1.5 | — | — | 1.5 | — | — | — | 97 |
| 57 | 57 | — | 6 | — | — | — | — | 94 | — |
| 58 | 58 | 5 | — | — | 10 | — | — | 85 | — |

Light stability is shown in Table 5

TABLE 5

| | light-stability (I) |||
| Ex | color before exposure | approx. after 165 h | approx. after 300 h |
|---|---|---|---|
| comp ex 40 | not yellow | severely yellowed | severely yellowed |
| comp ex 43 | not yellow | severely yellowed | severely yellowed |
| comp ex 53 | not yellow | yellowed | yellowed |
| comp ex 44 | not yellow | severely yellowed | severely yellowed |
| comp ex 45 | not yellow | severely yellowed | severely yellowed |
| comp ex 46 | not yellow | severely yellowed | severely yellowed |
| comp ex 54 | not yellow | severely yellowed | severely yellowed |
| comp ex 47 | not yellow | severely yellowed | severely yellowed |
| 55 | not yellow | no yellowing | no yellowing |
| comp ex 56 | not yellow | slightly yellowed | slightly yellowed |
| comp ex 65 | not yellow | severely yellowed | severely yellowed |
| 66 | not yellow | no yellowing | no yellowing |
| comp ex 62 | not yellow | slightly yellowed | slightly yellowed |
| comp ex 67 | not yellow | slightly yellowed | Slightly yellowed |
| 68 | not yellow | no yellowing | no yellowing |
| 57 | not yellow | no yellowing | no yellowing |
| 58 | slightly yellowed | slightly yellowed | slightly yellowed |

The exposure to Xenon light shows similar tendency after one week (approx 165 h) as after two weeks (approx. 300 h).

A severe yellowing could be seen as expected with comp ex 40, the pure PC/ABS-polymer. If the polymer was stabilized with the HALS-stabilizer compound of formula (XII) or a combination of HALS compound of formula (XII) and compound of formula (I), severe yellowing occurred as well. Compound of formula (XII) or a combination of compound of formula (XII) and compound of formula (I) is not suitable to hinder PC/ABS from yellowing, as comp ex 43, 44 and 45 showed. Stabilization with compound of formula (I) alone gave better results (comp ex 53) concerning yellowing. No synergistic effects of a combination of compound of formula (XII) and compound of formula (I) was observed.

A severe yellowing could also be observed with the polymer stabilized with UV-absorber compound of formula (V) or stabilized with a combination of UV-absorber compound of formula (V) and HALS compound of formula (I) and HALS compound of formula (XII), as comp examples 54 and 46 showed, therefore, also the UV-absorber compound of formula (V) could not counteract the negative influence of the HALS compound of formula (XII).

Comparative Examples 47 and 56 and Example 55

Table 5 cites the values measured.

A severe yellowing could be observed with PC/ABS stabilized with a combination of the two UV-absorbers compounds of formula (II) and (III) (comp ex 47), whereas the stabilization with the HALS compound of formula (I) still gave slightly yellowing (comp ex 56). Combination of compounds of formula (I), (II) and (III) gave excellent colour stability, no yellowing of the polymer could be observed, as example 55 showed. Furthermore, as the combination of compound of formula (I), (II) and (III) gave much better results as the stabilization with only the compound of formula (I) or only the compounds of formula (II) and (III), a synergistic effect was observed.

Comparative Examples 56, 62, 65 and 67 and Examples 66 and 68

Table 5 cites the values measured.

A yellowing (slightly to severely) could be observed with PC/ABS or PC stabilized with only the UV-absorber compound of formula (III) (comp ex 65 and 67), whereas the stabilization with the HALS compound of formula (I) still gave slightly yellowing (comp ex 56 and 62). Combination of compounds of formula (I) and (III) gave excellent colour stability, no yellowing of the polymer could be observed, as ex 66 and 68 showed. Furthermore, as the combination of compound of formula (I) and (III) gave much better results as the stabilization with only the compound of formula (I) or only the compound of formula (III), a synergistic effect was observed.

No negative influence of the mechanical properties of the polycarbonate could be observed, when HALS (I) was used, as shown in table 6 and 7.

TABLE 6

| | Mechanical properties before exposure to Xenon-lamp | | |
|---|---|---|---|
| Ex | Tensile strength [N/mm$^2$] | Tensile strength at break [N/mm$^2$] | Tensile strain [%] |
| comp ex 30 | 63.0 | 7.07 | 56.8 |
| comp ex 62 | 63.0 | 6.90 | 57.6 |
| comp ex 67 | 63.9 | 7.34 | 57.1 |
| 68 | 63.8 | 7.02 | 56.6 |

TABLE 7

| | Mechanical properties after 300 h exposure to Xenon-lamp | | |
|---|---|---|---|
| Ex | Tensile strength [N/mm$^2$] | Tensile strength at break [N/mm$^2$] | Tensile strain [%] |
| comp ex 30 | 62.8 | 6.58 | 56.1 |
| comp ex 62 | 64.0 | 6.61 | 57.9 |
| comp ex 67 | 63.9 | 6.81 | 57.0 |
| 68 | 63.6 | 6.72 | 58.0 |

Examples 57 and 58

Table 5 cites the values measured.

No yellowing of PC/ABS could be observed when stabilized with a combination of HALS compound of formula (I) and UV-absorbers compounds of formula (III) and (VIII) (example 57). Example 58 showed slight yellowing already before exposure, when using the combination of compounds of formula (I) and (III), due to the relatively high concentration of stabilizers and therefore the own, slightly yellow color of the stabilizers begins to show. The yellow color before exposure did not change during exposure, i.e. did not become more intense.

The invention claimed is:

1. A masterbatch Z comprising a component A, a component B and a component C and optionally a component D, where component A is a compound of the formula (I)

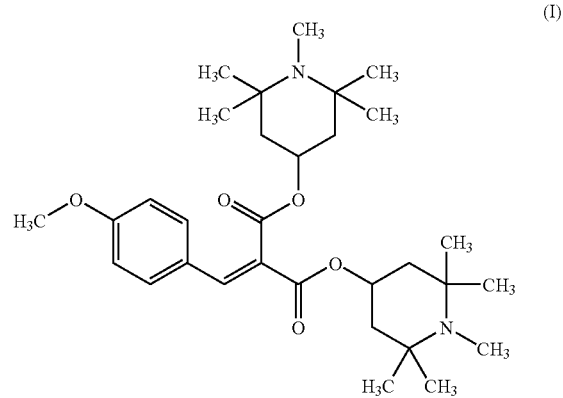

component C is one or more polymers selected from the group consisting of polycarbonates, and of blends composed of polycarbonate and of one or more polymers other than polycarbonate;
and of polymers compatible with polycarbonates, these polymers compatible with polycarbonates being selected from the group consisting of acrylonitrile-butadiene-styrene, styrene-acrylonitrile and polystyrene;

component B being a compound of formula (III)

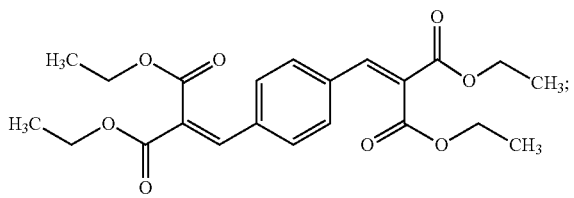

and component D being a UV stabilizer.

2. The masterbatch Z according to claim 1, where component D is a compound selected from the group consisting of compounds of the formulae (II), (IV), (V), (VI), (VII), (VIII), (IX), (X) and (XI).

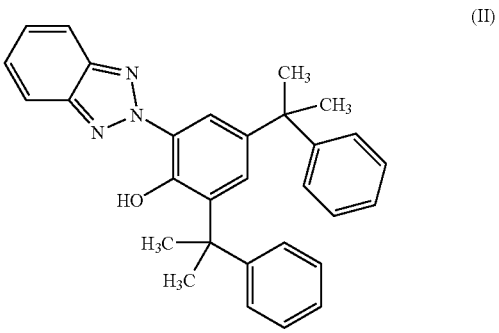

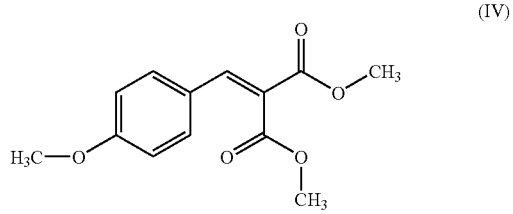

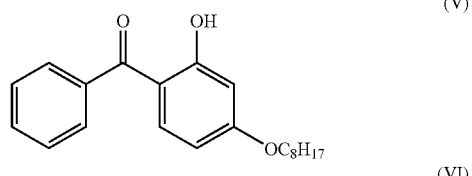

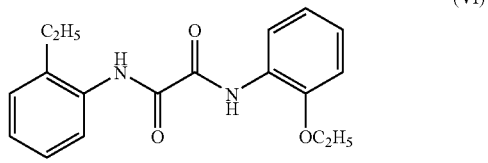

-continued

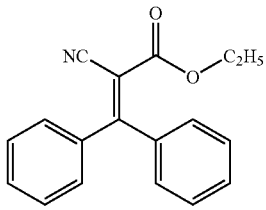 (VII)

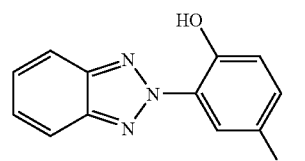 (VIII)

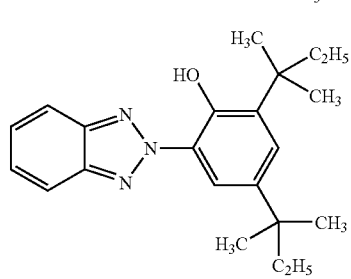 (IX)

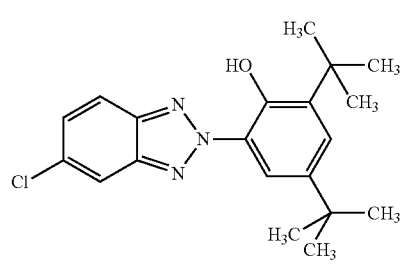 (X)

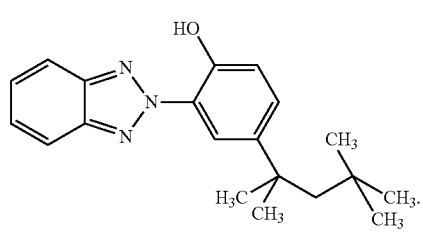 (XI)

3. The masterbatch Z according to claim 1, wherein the masterbatch Z is free from effective amounts of further hindered amine light stabilizer HALS with a chemical structure other than the structure of the compound of the formula (I).

4. The masterbatch Z according to claim 1, comprising
from 0.01 to 30% by weight of component A,
from 20 to 99.98% by weight of component C,
from 0.01 to 30% by weight of component B, and
from 0 to 79.98% by weight of further substances;
the % by weight values being based in each case on the total weight of the masterbatch Z; where the % by weight values for components A, B and C and for the further substances always give a total of 100% by weight.

5. The masterbatch Z according to claim 1, where the ratio by weight of component A to component B in the composition Z is from 1:10 to 10:1.

6. A process for the preparation of a masterbatch Z, comprising the step of physically mixing components A, B and C and optionally further substances, wherein the masterbatch Z comprises a component A, a component B and a component C and optionally a component D, where
component A is a compound of the formula (I)

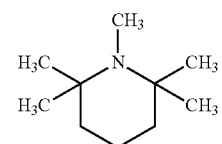

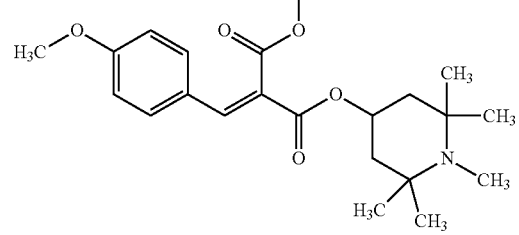 (I)

component C is one or more polymers selected from the group consisting of polycarbonates, and
of blends composed of polycarbonate and of one or more polymers other than polycarbonate;
and of polymers compatible with polycarbonates, these polymers compatible with polycarbonates being selected from the group consisting of acrylonitrile-butadiene-styrene, styrene-acrylonitrile and polystyrene;
component B being a compound of formula (III)

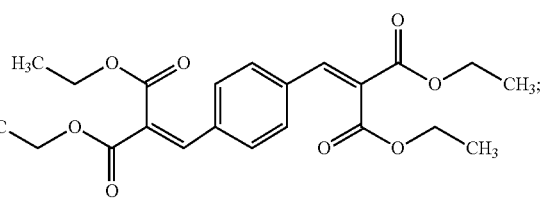 (III)

and component D being a UV stabilizer.

7. The process according to claim 6, where the mixing is done via extrusion, kneading, injection moulding or compression moulding.

8. The process according to claim 6, where the mixing temperature is from 100° C. to 380° C.

9. The process according to claim 6, wherein the mixing time is from 10 sec to 1 h.

10. A method of using masterbatch Z, for the preparation of, or as, stabilized polycarbonate polymer or stabilized polycarbonate blend, wherein the masterbatch Z comprises a component A, a component B and a component C and optionally a component D, where component A is a compound of the formula (I)

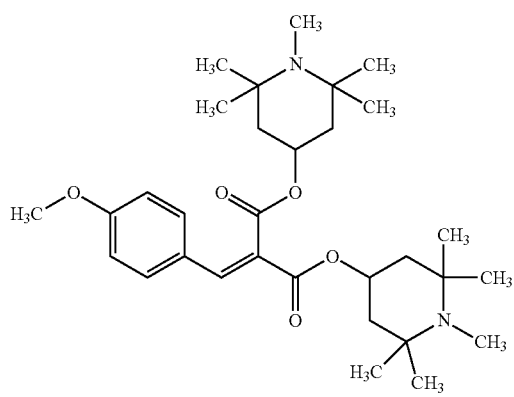

(I)

component C is one or more polymers selected from the group consisting of polycarbonates, and of blends composed of polycarbonate and of one or more polymers other than polycarbonate;

and of polymers compatible with polycarbonates, these polymers compatible with polycarbonates being selected from the group consisting of acrylonitrile-butadiene-styrene, styrene-acrylonitrile and polystyrene;

component B being a compound of formula (III)

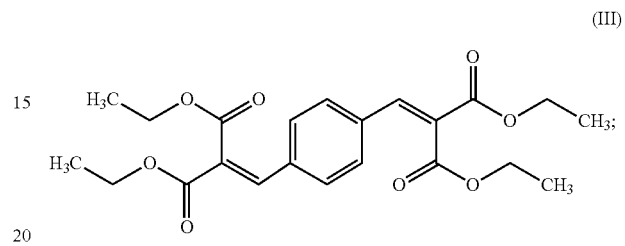

(III)

and component D being a UV stabilizer.

* * * * *